(12) United States Patent
Mao

(10) Patent No.: US 6,300,818 B1
(45) Date of Patent: Oct. 9, 2001

(54) TEMPERATURE COMPENSATION CIRCUIT FOR SEMICONDUCTOR SWITCH AND METHOD OF OPERATION THEREOF

(75) Inventor: Hengchun Mao, Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/640,352

(22) Filed: Aug. 16, 2000

Related U.S. Application Data

(62) Division of application No. 09/166,030, filed on Oct. 5, 1998, now Pat. No. 6,163,202.

(51) Int. Cl.[7] .................................................. H03K 17/78

(52) U.S. Cl. ........................ 327/513; 327/378; 327/538; 323/907

(58) Field of Search ................................. 327/512, 513, 327/378, 362, 83, 138, 530, 535, 538, 544; 330/136, 134, 150–154; 331/66, 161, 176; 323/907

(56) References Cited

U.S. PATENT DOCUMENTS

| | | | |
|---|---|---|---|
| 3,763,440 | * 10/1973 | Garcia et al. | 331/66 |
| 5,796,309 | * 8/1998 | Nguyen | 330/289 |
| 5,939,863 | * 8/1999 | Miller | 320/136 |
| 6,023,178 | * 2/2000 | Shioya et al. | 327/176 |

* cited by examiner

*Primary Examiner*—Timothy P. Callahan
*Assistant Examiner*—Minh Nguyen

(57) ABSTRACT

For use with a semiconductor switch that exhibits a temperature-dependent electrical characteristic and a current sense circuit that employs the characteristic of the switch to derive a switch current signal, a temperature compensation circuit, method of operation thereof and controller employing the same. In one embodiment, the circuit includes: (1) an electrical component, locatable in thermal communication with the switch and having a temperature-dependent electrical characteristic that bears an inverse relationship to the characteristic of the switch, that generates an intermediate signal based on an actual temperature of the switch and (2) a signal conditioning circuit, coupled to the electrical component, that scales the intermediate signal to yield a compensation signal that counteracts temperature-dependent variations in the switch current signal.

6 Claims, 1 Drawing Sheet ically transform an input DC voltage by converting it first to an AC signal, passing it through a transformer and then rectifying it to provide the desired value of output DC voltage. By employing various switching techniques, the power density of the converters may be increased.

TEMPERATURE COMPENSATION CIRCUIT FOR SEMICONDUCTOR SWITCH AND METHOD OF OPERATION THEREOF

This Application is a Divisional of prior application Ser. No. 09/166,030 filed on Oct. 5, 1998, to Hengchun Mao, now U.S. Pat. No. 6,163,202. The above-listed U.S. Patent is commonly assigned with the present invention and is incorporated herein by reference as if reproduced herein in its entirety under Rule 1.53(b).

TECHNICAL FIELD OF THE INVENTION

The present invention is directed, in general, to power conversion and, more particularly, to a temperature compensation circuit for semiconductor switch and method of operation thereof.

BACKGROUND OF THE INVENTION

The use of DC-DC power converters is wide spread in many important industries including those associated with larger telecommunication and computer installations. The converters are often expected to operate reliably over a variety of load and temperature conditions. The converters usually transform an input DC voltage by converting it first to an AC signal, passing it through a transformer and then rectifying it to provide the desired value of output DC voltage. By employing various switching techniques, the power density of the converters may be increased.

Most DC-DC converters are also expected to operate properly over widely varying values of load current. Many DC-DC converters are designed to supply a rated value of load current while maintaining a highly regulated output voltage. As the load current increases beyond the rated value, the output voltage is driven to zero to protect the converter from heat induced failure. Protection circuits are designed to protect the power rectifiers and other components of the converter from overly large load currents that may cause permanent component failure. Wide temperature operating requirements exacerbate the problems of over-voltage and over-current protection techniques, since the active circuit components of the converter have electrical characteristics that vary with temperature.

For example, the ON resistance of a power MOSFET employable as the power switch in a power converter varies directly with temperature. In the operating range of −40 degrees Celsius to 125 degrees Celsius, which is an operating range usually required for outdoor environments, the ON resistance of a typical MOSFET device may change more than 100%. In conjunction therewith, the ON voltage of the device, for a given current, also varies with temperature. If the ON voltage of the device is being used to provide current sensing in the converter, then a significant shift in the current protection point change may result due, in pertinent part, to the temperature-dependent characteristics of the device. Also, the protection system is further complicated by the fact that the sensed voltage of the switch is usually very noisy. The above described attributes, therefore, usually dictate that while the sensed voltage characteristic may be employed in protection systems, it is not the characteristic of choice for current-mode control of the converter. Additionally, while other sensing techniques involving bulky transformers and resistor networks may be employed, it is at the expense of higher costs and lossy control systems.

Accordingly, what is needed in the art is a system and related method adapted to sense and compensate for temperature effects on components of a power converter that effectively enhances current protection accuracy and stabilizes converter control.

SUMMARY OF THE INVENTION

To address the above-described deficiencies of the prior art, the present invention provides, for use with a semiconductor switch that exhibits a temperature-dependent electrical characteristic and a current sense circuit that employs the characteristic of the switch to derive a switch current signal, a temperature compensation circuit, method of operation thereof and controller employing the same. In one embodiment, the circuit includes: (1) an electrical component, locatable in thermal communication with the switch and having a temperature-dependent electrical characteristic that bears an inverse relationship to the characteristic of the switch, that generates an intermediate signal based on an actual temperature of the switch and (2) a signal conditioning circuit, coupled to the electrical component, that scales the intermediate signal to yield a compensation signal that counteracts temperature-dependent variations in the switch current signal.

In one embodiment of the present invention, the electrical characteristic is resistance. In many semiconductor switches, the ON resistance of the device varies directly with temperature. In other semiconductor devices, the ON resistance varies indirectly. In either case the temperature variation may be accommodated for effective compensation.

In one embodiment of the present invention, the electrical component is a Schottky diode. Schottky diodes exhibit temperature effects that may be used to effectively compensate for the temperature effects in other devices.

In one embodiment of the present invention, the semiconductor switch is a field-effect transistor (FET). Of course, other semiconductor switches are well within the broad scope of the present invention.

In one embodiment of the present invention, the current sense circuit comprises a comparison circuit that combines the switch current signal and the compensation signal to yield a temperature-compensated switch current signal. This switch current signal may be then employed to compensate for temperature differences over a wide range of temperatures.

In one embodiment of the present invention, the signal conditioning circuit further skews the intermediate signal to yield the compensation signal. Skewing of the intermediate signal allows it to be applied in a broad range of compensation circuits.

In one embodiment of the present invention, the signal conditioning circuit is a resistor divider network. Conversely, the signal conditioning circuit may be other networks that allow proper presentation of the required signal conditioning circuit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
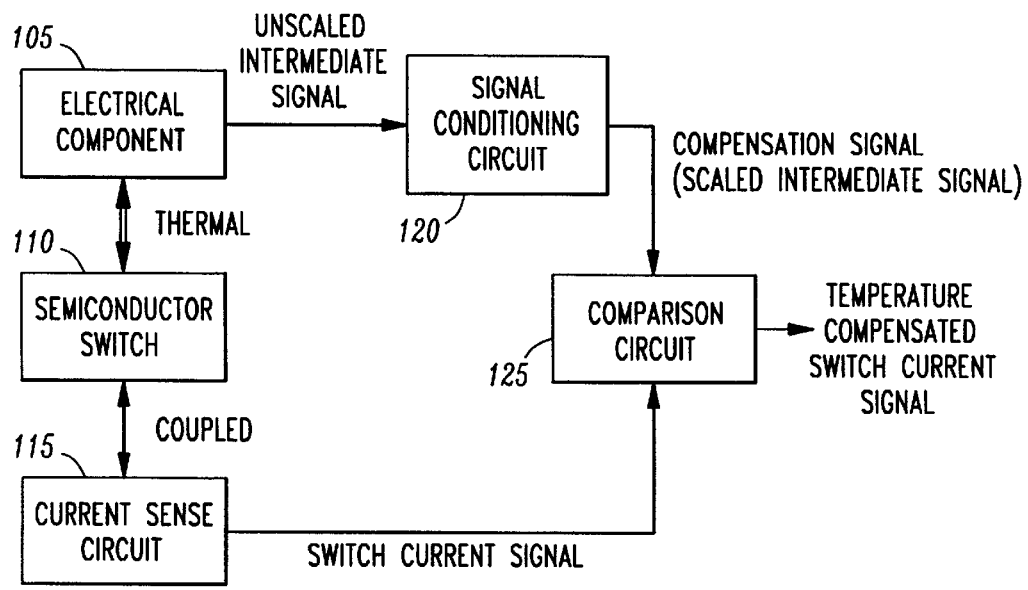
FIG. 1 illustrates a block diagram of an embodiment of a controller constructed according to the principles of the present invention.

Referring initially to FIG. 1, illustrated is a block diagram of an embodiment of a controller constructed according to the principles of the present invention. The controller is coupled to a semiconductor switch 110 and includes a temperature compensation circuit (comprising an electrical component 105 and a signal conditioning circuit 120), a current sense circuit 115 and a comparison circuit 125. The current sense circuit 115 senses a current within the semiconductor switch 110 and employs a temperature-dependent electrical characteristic of the semiconductor switch 110 to derive a switch current signal for use by the temperature compensation circuit, as part of a method of operation of the controller.

In this embodiment, the electrical component 105 is located in thermal communication with the semiconductor switch 110 and has a temperature-dependent electrical characteristic that bears an inverse relationship to the temperature-dependent characteristic of the semiconductor switch 110. The electrical component 105 generates an unscaled intermediate signal based on an actual temperature of the semiconductor switch 110. In a preferred embodiment, the electrical component 105 may be a Schottky diode that has an ON voltage, which varies inversely with temperature. With a small forward bias current, the ON voltage across a Schottky diode may be almost zero at higher temperatures and is approximately 200 millivolts at lower temperatures. Additionally, the nearly linear temperature dependency of a Schottky diode makes it less complex and low-cost temperature compensator.

The signal conditioning circuit 120, coupled to the electrical component 105, scales the intermediate signal to yield a compensation signal that counteracts temperature-dependent variations in the current signal of the semiconductor switch 110. Additionally, the signal conditioning circuit 120 may further skew the intermediate signal to yield the compensation signal. In an advantageous embodiment, the signal conditioning circuit 120 may include a resistor divider network. The comparison circuit 125 combines the switch current signal from the current sense circuit 115 and the compensation signal from the signal conditioning circuit 120 to yield a temperature-compensated switch current signal.

In advantageous embodiment, the semiconductor switch 110 may be a field-effect transistor (FET). In such an embodiment, the temperature dependent electrical characteristic is the drain-to-source ON resistance (Rdson) of the FET which varies directly with temperature and, therefore, causes the conducting-state drain-to-source voltage (the ON-drop voltage) to vary directly with temperature.

Figure 2:
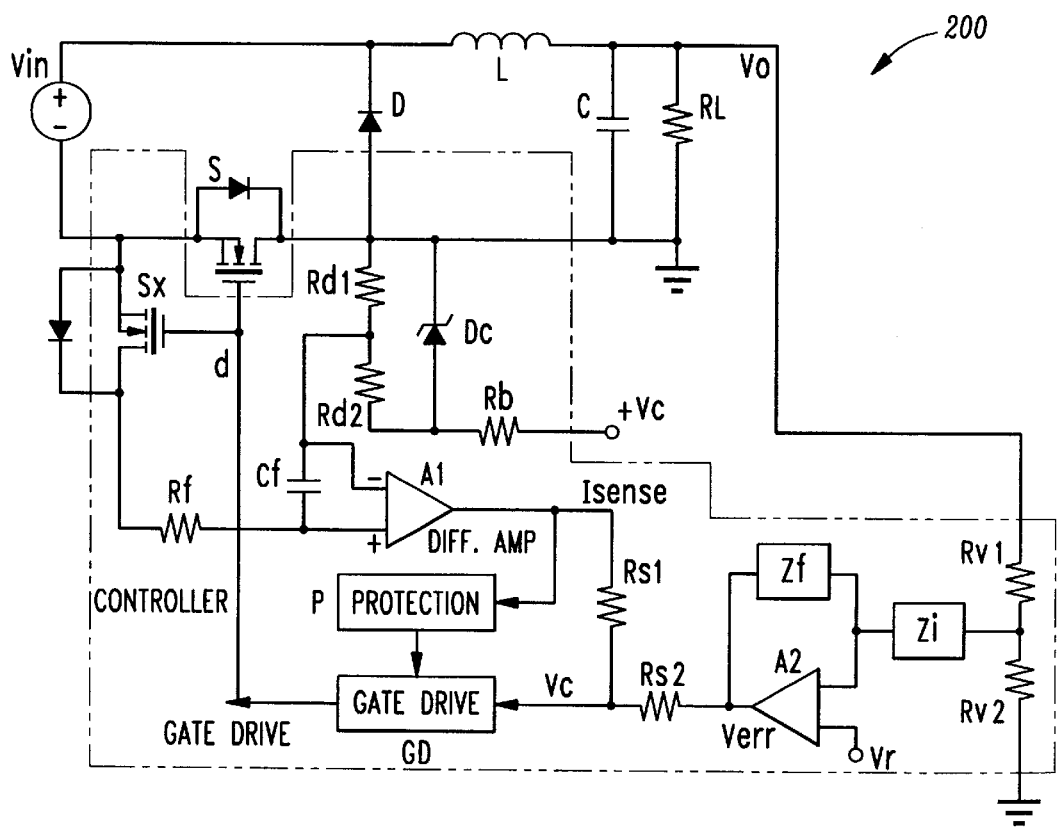
FIG. 2 illustrates a schematic diagram of an embodiment of a power supply employing an embodiment of a controller constructed according to the principles of the present invention.

Turning now to FIG. 2, illustrated is a schematic diagram of a power supply 200 employing an embodiment of a controller constructed according to the principles of the present invention. The power converter (a buck converter arrangement in this embodiment) includes an input voltage source Vin, a power switch circuit S, a diode D, a filter inductor L, a filter capacitor C and an output load resistor $R_L$, and develops an output voltage Vo. The controller includes a temperature compensation circuit (comprising an electrical component Dc with a bias resistor Rb and a signal conditioning circuit formed by a resistor divider Rd1/Rd2), a current sense circuit and a comparison circuit A1. The current sense circuit includes a sense switch Sx and an R-C filter Rf/Cf. The controller further includes a voltage comparison circuit comprising an input voltage divider Rv1/Rv2, a comparison amplifier A2 that includes an input impedance Zi, a feedback impedance Zf, a reference voltage Vr and an output voltage divider Rs1/Rs2. The controller also includes a gate drive circuit GD and a protection circuit P. In principle, the sense switch Sx and the power switch circuit S share the same gate drive circuit. In practice, some delay between the two may be employed to isolate switching noise associated with the power switch circuit S.

The ON-resistance Rdson of the power switch circuit S increases with temperature. Therefore, the ON-drop voltage of the power switch circuit S also increases with temperature for a constant power supply 200 current. Generally, the electrical component Dc, with either a positive or a negative temperature coefficient, can be used to compensate this temperature dependency. In the present embodiment, a Schottky diode is used as the electrical component Dc because it possesses an almost linear negative temperature coefficient, a very low voltage drop at high temperatures with low bias currents and an attractively low cost. Those skilled in the art will recognize that other components, such as PTC/NTC thermistors and PIN diodes, may be employed as the electrical component Dc.

A temperature compensation system may then be achieved by coupling a proportional voltage, via the resistor divider Rd1/Rd2, to the sensed voltage of the power switch circuit S. An issue for proper operation of the temperature compensation circuit is to keep the junction temperatures of the electrical component Dc and the power switch circuit S at about the same temperature. This can be done by putting the two devices physically as close as possible (even in the same package) and coupling them with a short trace or putting them on the same heat spreader.

In FIG. 2, the voltage across the main power switch S is being employed to provide current sensing in the power supply 200. The bias resistor Rb sets a low current bias to the electrical component Dc, which is also coupled electrically to the power switch circuit S as shown. The signal conditioning resistor divider Rd1/Rd2 conditions the voltage of the electrical component Dc to provide the necessary compensation. If more compensation voltage is required, the voltage of the electrical component Dc may also be used directly or even amplified in other circuit arrangements.

The sense switch Sx shares the same gate drive signal as the power switch S, so that the voltage across the power switch S is sensed only when it is conducting (turned-on). For simplicity, the complete gate drive circuit is not shown, and some delay or other timing adjustment may also be applied to the gate drives as needed. The R-C filter Rf/Cf and the resistor divider Rd1/Rd2 also form a low-pass filter to reduce switching noise associated with the switching action of the power switch circuit S. The filtered signal is then applied to the comparison circuit A1 to adjust the sensed signal to a desired level. The power switch circuit S and the sense switch Sx are shown for illustrative purposes as N-channel MOSFETs. In related embodiments, they may also be implemented as P-MOSFETs, or other appropriate switching components.

The output voltage divider Rs1/Rs2 forms a summing circuit to combine a current compensated signal (Isense) and a regulating circuit output voltage (Verr), such that a power converter current control system is achieved. The current compensated signal Isense may also be directly applied to a ramp signal in a pulse-width modulation (PWM) controller or to a compensator used in an average current control system in association with the gate drive circuit GD. Compared to traditional peak current mode control, the current control system shown in FIG. 2 may lose some high-frequency information because of the signal filtering. However, compared to voltage mode control, this system still achieves much higher control bandwidth.

This system is also highly attractive in multi-output converters. The primary inverter can be any power circuit which generates a high-frequency voltage across transformer windings. Multiple transformers are also possible. All outputs can be implemented as post regulators and the current control systems shown in FIG. 2 may be applied to each output, regardless of whether it is operated in, for instance, a forward mode, flyback mode or full-wave mode. However, when the main output is implemented with synchronous rectifiers, then a similar current control system as shown in FIG. 2 can be applied by sensing the voltage across the two synchronous rectifiers. It is also possible to sense just one switch voltage if fast current protection is not is required. One advantage of this system, compared to traditional primary current mode control, is that the inverter control only responds to the main output current, so that interaction between different outputs will be significantly reduced.

While specific embodiments of a power supply and a controller and related method have been illustrated and described, other embodiments are well within the broad scope of the present invention. For a better understanding of switching power converters, in general, see "Principles of Power Electronics" by John G. Kassakian, et al., Addison Wesley, Inc. (1991), which is incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. For use with a power supply having a semiconductor switch that exhibits a temperature-dependent electrical characteristic, a controller, comprising:
    a current sense circuit that employs said characteristic of said switch to derive a switch current signal;
    a temperature compensation circuit, including:
        an electrical component, locatable in thermal communication with said switch and having a temperature-dependent electrical characteristic that bears an inverse relationship to said characteristic of said switch, that generates an intermediate signal based on an actual temperature of said switch, and
        a signal conditioning circuit, coupled to said electrical component, that scales said intermediate signal to yield a compensation signal that counteracts temperature-dependent variations in said switch current signal;
    a comparison circuit that combines said switch current signal and said compensation signal to yield a temperature-compensated switch current signal;
    an output voltage error circuit, coupled to an output of said power supply, that biases said temperature-compensated switch current signal with an output voltage error signal; and
    a pulse-width modulation (PWM) controller, coupled to said comparison circuit and said output voltage error circuit, that develops a control signal for said power supply based on said temperature-compensated switch current signal and said output voltage error signal.

2. The controller as recited in claim 1 wherein said electrical characteristic is resistance.

3. The controller as recited in claim 1 wherein said electrical component is a Schottky diode.

4. The controller as recited in claim 1 wherein said semiconductor switch is a field-effect transistor (FET).

5. The controller as recited in claim 1 wherein said signal conditioning circuit further skews said intermediate signal to yield said compensation signal.

6. The controller as recited in claim 1 wherein said signal conditioning circuit is a resistor divider network.

* * * * *